(12) United States Patent
Kawai

(10) Patent No.: US 12,393,393 B2
(45) Date of Patent: Aug. 19, 2025

(54) DISPLAY SYSTEM WITH A ROTARY MACHINE AND DRIVE MACHINE

(71) Applicant: EBARA CORPORATION, Tokyo (JP)

(72) Inventor: Masahito Kawai, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 84 days.

(21) Appl. No.: 17/997,741

(22) PCT Filed: Feb. 26, 2021

(86) PCT No.: PCT/JP2021/007384
§ 371 (c)(1),
(2) Date: Nov. 2, 2022

(87) PCT Pub. No.: WO2021/225022
PCT Pub. Date: Nov. 11, 2021

(65) Prior Publication Data
US 2023/0221915 A1    Jul. 13, 2023

(30) Foreign Application Priority Data

May 8, 2020   (JP) ................................. 2020-082531

(51) Int. Cl.
*G06F 3/147*     (2006.01)
*F04B 43/12*     (2006.01)
*G06F 3/13*      (2006.01)

(52) U.S. Cl.
CPC .......... *G06F 3/147* (2013.01); *F04B 43/1269* (2013.01); *G06F 3/13* (2013.01)

(58) Field of Classification Search
CPC ....................................................... G06F 3/147
See application file for complete search history.

(56) References Cited

U.S. PATENT DOCUMENTS 7,107,184 B2     9/2006  Gentile et al.
2003/0144818 A1*  7/2003  Kasuya ................... F04B 49/00
                                                   702/185

(Continued)

FOREIGN PATENT DOCUMENTS

JP      2002-242849 A      8/2002
JP      2014-105671 A      6/2014

(Continued)

OTHER PUBLICATIONS

International Search Report issued in Patent Application No. PCT/JP2021/007384 dated Apr. 27, 2021.

(Continued)

*Primary Examiner* — Shivang I Patel
(74) *Attorney, Agent, or Firm* — Chrisman Gallo Tochtrop LLC

(57) ABSTRACT

A display system is provided that includes: a rotary machine device including a rotary machine and a drive machine causing the rotary machine to rotate; a display device capable of displaying a state of the rotary machine device; a detection section acquiring plural state quantities indicating the state of the rotary machine device; and a display control section displaying a chart on the display device on the basis of the plural state quantities acquired by the detection section, the chart being configured as a multidimensional chart in which the plural state quantities of the rotary machine device at specific time are plotted and the plural state quantities are set as values, each of which corresponds to each axis.

16 Claims, 9 Drawing Sheets

(56) References Cited

U.S. PATENT DOCUMENTS

| | | | |
|---|---|---|---|
| 2007/0216706 A1* | 9/2007 | Suyama | G06F 16/283 |
| | | | 345/606 |
| 2015/0025689 A1 | 1/2015 | Saravanapriyan et al. | |
| 2017/0300027 A1* | 10/2017 | Oyama | G07C 3/00 |
| 2020/0090424 A1 | 3/2020 | Honda et al. | |
| 2020/0109712 A1 | 4/2020 | Maishigi et al. | |
| 2021/0027506 A1* | 1/2021 | Antihi | G06T 11/206 |
| 2021/0081099 A1* | 3/2021 | Uy | G06F 3/04817 |

FOREIGN PATENT DOCUMENTS

| | | | |
|---|---|---|---|
| JP | 2015-516530 A | 6/2015 | |
| JP | 2016-081482 A | 5/2016 | |
| JP | 2019-169094 A | 10/2019 | |
| JP | 6607687 B2 | 11/2019 | |
| JP | 2020-201683 A | 12/2020 | |
| WO | 2012/090937 A1 | 7/2012 | |
| WO | 2017/090420 A1 | 6/2017 | |
| WO | 2018/168838 A1 | 9/2018 | |

OTHER PUBLICATIONS

Extended European search report issued in European Patent Application No. 21800953.8 dated Apr. 22, 2024.

* cited by examiner

FIG.4

| SETTING OF THRESHOLD | | | | | 35 |
|---|---|---|---|---|---|
| | S1 | S2 | | Sn | |
| TEMPERATURE | X1 | X2 | ... | Xn | |
| AMPLITUDE | Y1 | Y2 | ... | Yn | |

DISPLAY SYSTEM WITH A ROTARY MACHINE AND DRIVE MACHINE

TECHNICAL FIELD

The present disclosure relates to a display system, a display device, and a display method for displaying a state of a rotary machine device.

BACKGROUND ART

A rotary machine, for example, a pump used for a water supply system is provided with one or plural sensors, each of which periodically detects various state quantities in order to detect or estimate abnormality or a sign of abnormality (hereinafter, these will collectively be referred to as "abnormality") by monitoring an operation state thereof. One or the plurality of these sensors is arranged at appropriate positions of the pump and measures vibration generated on the pump and/or a temperature of the pump.

SUMMARY OF INVENTION

Technical Problem

The abnormality of the pump is accompanied by changes in the various state quantities. Thus, techniques of diagnosing the abnormality of the pump and predicting failure thereof by monitoring the plural state quantities have been known. For example, in Japanese Patent No. 6607687, a sensor is provided to a part of the pump, and a state of the pump is monitored by monitoring vibration and the temperature detected by this sensor.

In general, as the number of types of the state quantities, which are used to determine the abnormality of the pump, are increased, the abnormality detection and the failure prediction can be made more accurately. However, a way of setting a threshold, with which the abnormality is determined, for each of the plural state quantities can vary by various factors. For example, since the abnormality of the pump depends on a model or an installation condition, the threshold has to be changed accordingly. In addition, the desired threshold differs by management level requested by each user, and examples of the management level are that the user desires to use the pump as is until the abnormality actually occurs to the pump and that the user desires preventive maintenance before failure of the pump. For such reasons, it is difficult to set the threshold, with which the abnormality is determined, before the pump is installed at a site, and it is necessary for a worker or the like to set the threshold at the site where the pump is installed. In particular, in the case where the sign of the abnormality is to be detected or estimated, the determination of the abnormality may be appropriate when numerical values of the plural state quantities fluctuate near the thresholds while each of the state quantities does not reach the set threshold. Thus, in order to appropriately monitor the abnormality of the pump, such a mechanism is requested that can mutually check the plural state quantities of the pump.

The present disclosure has been made in view of the above-described problem and therefore has a purpose of providing a display system, a display device, and a display method capable of displaying various state quantities of a rotary machine device with high visibility.

Solution to Problem

In order to achieve the above purpose, a display system 1 according to a first aspect of the present disclosure includes, as illustrated in FIG. 1 and FIG. 2, for example: a rotary machine device 10 that includes a rotary machine 11 and a drive machine 12 that causes the rotary machine 11 to rotate; a display device 20 capable of displaying a state of the rotary machine device 10; a detection section 13 that acquires plural state quantities indicating the state of the rotary machine device 10; and a display control section 26 that displays multidimensional charts 33, 36, 37 on the display device 20 on the basis of the plural state quantities acquired by the detection section 13, each of the chart being configured as a multidimensional chart in which the plural state quantities of the rotary machine device 10 at specific time are plotted and in which the plural state quantities are set as values, each of which corresponds to each axis.

With such a configuration, the various state quantities of the rotary machine device can be displayed in the form of the multidimensional chart in which the plural state quantities are values corresponding to the respective axes. Therefore, such display can be provided that the plural state quantities can be checked by the single chart.

In the display system 1 according to the first aspect of the present disclosure, the plural state quantities in a display system 1 according to a second aspect of the present disclosure are, as illustrated in FIG. 3, for example, at least two of a temperature of the rotary machine device 10, vibration generated to the rotary machine device 10, a pressure of a fluid transported by the rotary machine device 10, a flow rate of the fluid, a rotational speed of the drive machine 12, and a current value of the drive machine 12.

With such a configuration, for example, a rapid temperature increase and the large vibration that occur to the rotary machine device are significantly correlated with abnormality of the rotary machine device. Therefore, it is possible to provide display with which the abnormality can be determined with a high degree of accuracy.

In the display system 1 according to the first or second aspect of the present disclosure, a display system 1 according to a third aspect of the present disclosure has, as illustrated in FIG. 3, FIG. 5, and FIG. 6, for example, the multidimensional chart in which a point P indicating the plural state quantities of the rotary machine device 10 at current time, a locus L of the plural state quantities of the rotary machine device 10 in a specified period including the current time, and distribution regions E1 to E3 of the plural state quantities of the rotary machine device 10 in the specified period are displayed.

With such a configuration, plural types of the display can be provided as the display of the chart. Therefore, it is possible to provide the display that matches a user's request.

In the display system 1 according to the first to third aspects of the present disclosure, a display system 1 according to a fourth aspect of the present disclosure has, as illustrated in FIG. 3, FIG. 5, and FIG. 6, for example, the display device that simultaneously displays a first time-series chart 31 showing time-series data of a first state quantity of the plural state quantities and a second time-series chart 32 showing time-series data of a second state quantity of the plural state quantities in addition to the multidimensional chart.

With such a configuration, the user who sees the display device can simultaneously check the time-series charts, each of which shows the single state quantity, in addition to the multidimensional chart. Therefore, the user can further easily comprehend a relative change and a distribution state of the state quantity.

In the display system 1 according to the first to fourth aspects of the present disclosure, a display system 1 according to a fifth aspect of the present disclosure further includes, as illustrated in FIG. 2, for example, a threshold setting section 27 capable of setting a threshold, which corresponds to each of the plural state quantities for detecting the abnormality of the rotary machine device 10, in a mutually associated state.

With such a configuration, each of the thresholds corresponding to the plural state quantities can be set in the mutually associated form. Therefore, the abnormality can be diagnosed in consideration of the plural state quantities.

In the display system 1 according to the fifth aspect of the present disclosure, a display system 1 according to a sixth aspect of the present disclosure has, as illustrated in FIG. 2, for example, the threshold setting section 27 that sets the specified threshold by designating a specified range in the chart displayed on the display device 20 using an input interface 25.

With such a configuration, setting of the threshold is completed simply by designating the specified range in the chart. Therefore, the threshold can be set by an intuitive operation.

In the display system 1 according to the first to sixth aspects of the present disclosure, a display system 1 according to a seventh aspect of the present disclosure has the threshold that corresponds to each of the plural state quantities for detecting the abnormality of the rotary machine device 10 and is set stepwise by level, and further includes a notification section that makes notification according to the level of the threshold that the plural state quantities of the rotary machine device 10 exceed.

With such a configuration, the notification can be made stepwise according to the state of the rotary machine device. Therefore, the user can easily comprehend the state of the rotary machine device.

In the display system 1 according to the first to seventh aspects of the present disclosure, a display system 1 according to an eighth aspect of the present disclosure includes, as illustrated in FIG. 9, for example, threshold memory 51 in which the threshold corresponding to each of the plural state quantities for detecting the abnormality of the rotary machine device 10 is associated with each model of the rotary machine device and is saved as a first threshold group. When initially setting the threshold, the display control section 26 sets the threshold, which is associated with the model of the rotary machine device, from the first threshold group saved in the threshold memory 51.

With such a configuration, the initial setting can easily be performed by using the threshold, which is stored in the threshold memory, according to the type of the rotary machine device. Therefore, a burden of management can be reduced.

A display device 20 according to a ninth aspect of the present disclosure includes, as illustrated in FIG. 2, for example, a display section 21; a data acquisition section 23 that acquires a state quantity indicating a state of a rotary machine device 10, the rotary machine device 10 including a rotary machine 11 and a drive machine 12 that causes the rotary machine 11 to rotate; and a display control section 26 that displays a chart in the display section 21 on the basis of the plural state quantities acquired by the data acquisition section 23, the chart being configured as a multidimensional chart in which the plural state quantities of the rotary machine device 10 at specific time are plotted and in which the plural state quantities are set as values, each of which corresponds to each axis.

With such a configuration, the various state quantities of the rotary machine device can be displayed in the form of the multidimensional chart in which the plural state quantities are values corresponding to the respective axes. Therefore, such display can be provided that the plural state quantities can be checked by the single chart.

A display method according to a tenth aspect of the present disclosure includes, as illustrated in FIG. 7, for example: a step S101 of acquiring plural state quantities indicating a state of a rotary machine device 10, the rotary machine device 10 including a rotary machine 11 and a drive machine 12 that causes the rotary machine 11 to rotate; a step S102 of generating a multidimensional chart in which each of the plural state quantities is set as a value corresponding to each axis; a step S103 of plotting the plural state quantities of the rotary machine device 10 at specific time in the multidimensional chart; and a step S105 of displaying the multidimensional chart, in which the plural state quantities of the rotary machine device at the specific time are plotted, on the display device.

With such a configuration, the various state quantities of the rotary machine device can be displayed in the form of the multidimensional chart in which the plural state quantities are values corresponding to the respective axes. Therefore, such display can be provided that the plural state quantities can be checked by the single chart.

In the display method according to the tenth aspect of the present disclosure, a display method according to an eleventh aspect of the present disclosure further includes, as illustrated in FIG. 7, for example, a step S104 of setting a threshold that corresponds to each of the plural state quantities for detecting abnormality of the rotary machine device 10 in a mutually associated state.

With such a configuration, each of the thresholds corresponding to the plural state quantities can be set in the mutually associated form. Therefore, the abnormality can be diagnosed in consideration of the plural state quantities.

In the display method according to the tenth or eleventh aspect of the present disclosure, a display method according to a twelfth aspect of the present disclosure further has, as illustrated in FIG. 8, for example, the step S103 of plotting the plural state quantities of the rotary machine device at the specific time in the multidimensional chart that at least includes any of: a step S202 of plotting the plural state quantities of the rotary machine device at current time in the multidimensional chart; a step S203 of plotting a locus of the plural state quantities of the rotary machine device in a specified period including the current time in the multidimensional chart; and a step S204 of plotting a distribution region of the plural state quantities of the rotary machine device in the specified period in the multidimensional chart.

With such a configuration, plural types of the display can be provided as the display of the chart. Therefore, it is possible to provide the display that matches a user's request.

Advantageous Effects of Invention

According to the display system, the display device, and the display method of the present disclosure, the various state quantities of the rotary machine device can be displayed with high visibility by adopting the series of the configurations described above.

BRIEF DESCRIPTION OF DRAWINGS

FIG. 4 is a schematic explanatory table illustrating an example of a threshold setting screen according to the embodiment of the present disclosure.

DESCRIPTION OF EMBODIMENTS

The present application is based on Japanese Patent Application No. 2020-082531 filed in Japan on May 8, 2020, the contents of which constitute a part of the contents of the present application.

The present invention will be more fully understood by the following detailed description. The further application scope of the present application will become apparent in the following detailed description. However, the detailed description and specific examples merely constitute preferred embodiments of the present invention and are provided for illustrative purposes only. This is because, from this detailed description, various changes and modifications will become apparent to those skilled in the art, within the spirit and the scope of the present invention.

The applicant does not intend to dedicate any of the described embodiments to the public, and any disclosed modifications or alternatives that may not be literal within the scope of the claims shall be part of the invention under the doctrine of equivalents.

A description will hereinafter be made on each mode for carrying out the present invention with reference to the drawings. Hereinafter, the scope necessary for the description to achieve the purpose of the present invention will be provided schematically, and the scope necessary for the description of the relevant part of the present invention will be mainly described. The parts whose description will be omitted will be based on known techniques.

<Display System>

Figure 1:
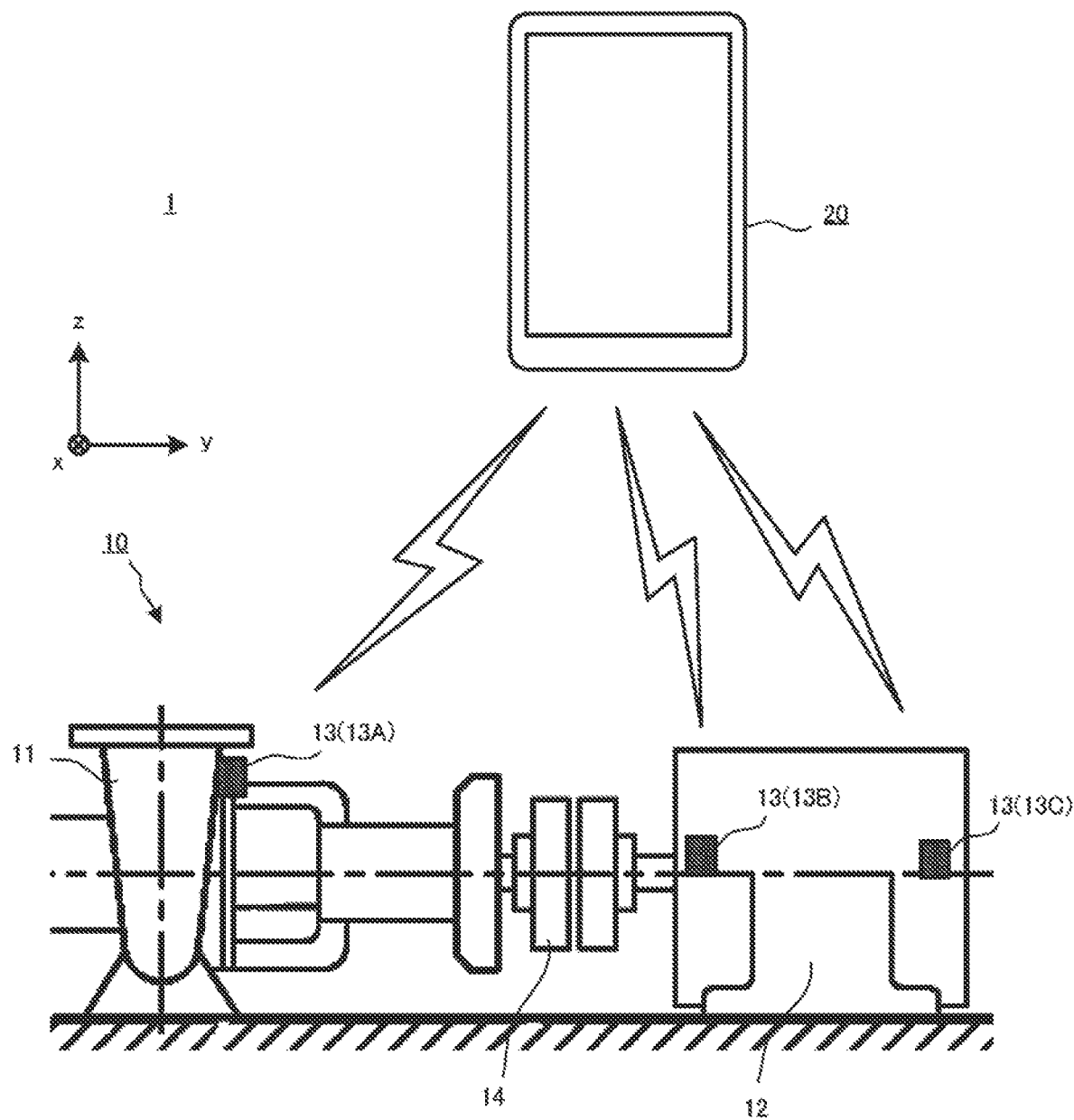
FIG. 1 is a schematic structural view illustrating an example of a display system according to an embodiment of the present disclosure.
Figure 2:
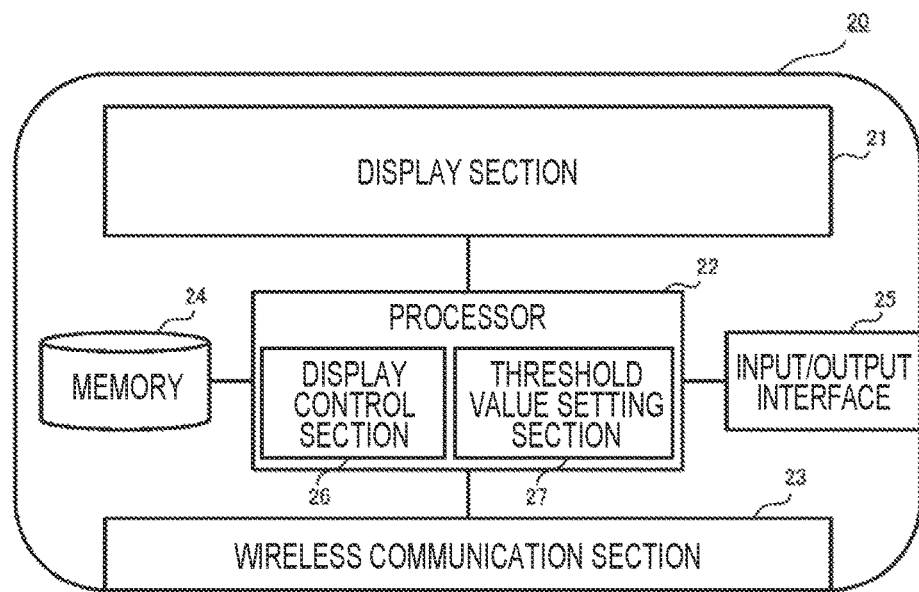
FIG. 2 is a block diagram illustrating some functions of the example of the display system according to the embodiment of the present disclosure.
Figure 2:
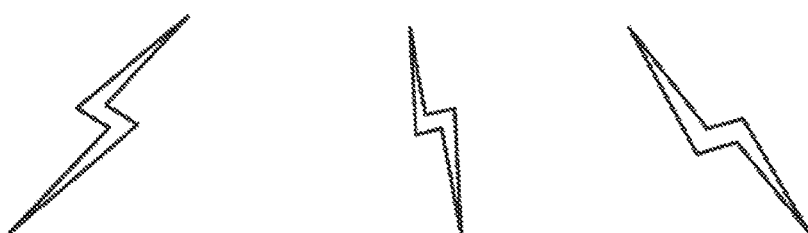
Figure 2:
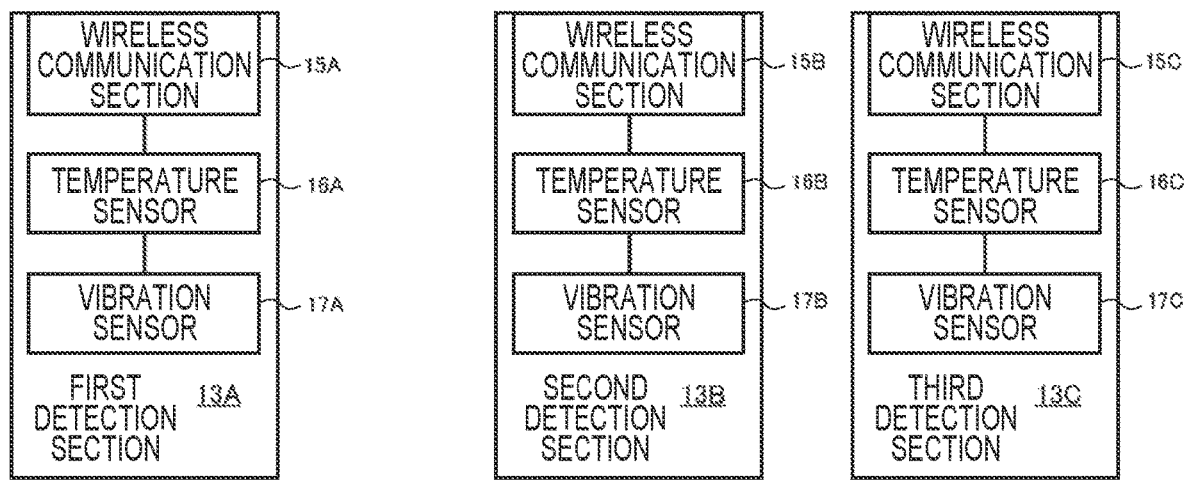

FIG. 1 is a schematic structural view illustrating an example of a display system according to an embodiment of the present disclosure. FIG. 2 is a block diagram illustrating some functions of the example of the display system according to the embodiment of the present disclosure. As illustrated in FIG. 1 and FIG. 2, a display system 1 in this embodiment exemplifies a series of systems configured to display a state quantity of an appropriate pump device (corresponding to an example of a rotary machine device), and at least includes a pump device 10 and a display device 20.

As illustrated in FIG. 1, the pump device 10 is a horizontal-axis, single-stage pump, for example, and may at least include: a pump body (an example of a rotary machine) 11 for supplying water to a building or the like; an electric motor (an example of a drive machine) 12; and a detection section 13 installed at an appropriate position of the pump device 10. In this embodiment, the rotary machine device for which the pump is adopted as the rotary machine and the electric motor is adopted as the drive machine is exemplified. However, a similar display system can also be applied to each of other rotary machine devices such as various turbines, compressors, fans, and blowers. In addition, the pump type is not limited to the above-described horizontal-axis, single-stage pump. For example, a vertical-axis, multistage pump, a submerged pump, or the like can also be adopted.

The pump body 11 can be a centrifugal pump that is used to supply tap water to the building such as a housing complex or an office building. An impeller (not illustrated) that is provided in this pump body 11 is rotatably coupled to a driveshaft of the electric motor 12, which will be described below, via a coupling 14.

The electric motor 12 is a drive source for causing rotation of the impeller in the above-described pump body 11. A permanent magnet motor, an induction motor, an SR motor, or the like can be adopted. Although a detailed configuration of this electric motor 12 will not be described, for example, the electric motor 12 can include: a motor body that has the driveshaft; an inverter for changing a speed of rotational drive of this motor body; and a controller that controls this inverter.

One or a plurality of the detection sections 13 is attached to appropriate positions of the pump device 10 and can detect various state quantities of the pump device 10, in detail, at least one of a temperature of the pump device 10 and vibration generated to the pump device 10 in real time. For the pump device 10 according to the embodiment illustrated in FIG. 1, a total of the three detection sections (more specifically, a first detection section 13A, a second detection section 13B, and a third detection section 13C) is adopted, one thereof is provided on an outer wall of a casing of the pump body 11, and two thereof are provided on bearings for supporting the driveshaft of the electric motor 12. The arrangement of the detection sections 13 is not limited to that described above, and can appropriately be changed as long as the detection sections 13 are provided at positions, such a bearing portion of the pump body 11 and a casing portion of the electric motor 12, at each of which at least one of the temperature and the vibration of the pump device 10 can be measured.

As the state quantities that are the detection targets by these detection sections 13, in addition to the temperature and the vibration described above, a pressure and a flow rate of water flowing through the pump body 11, a rotational speed and a current value of the electric motor 12, and the like can be exemplified. That is, as the plural state quantities that are detected by the detection section 13, preferably, at least two of a temperature of a rotary machine device 10, vibration generated to the rotary machine device 10, a pressure of a fluid transported by the rotary machine device 10, a flow rate of the fluid, the rotational speed of the electric motor 12, and the current value of the electric motor 12. Here, the pressure and the flow rate of water flowing through the pump body 11 can be detected by providing a well-known pressure sensor and a well-known flow rate sensor at specified positions of the pump body 11, and the rotational speed and the current value of the electric motor 12 can be detected by acquiring a control signal or the like of the controller or the inverter in the electric motor 12.

As specific configurations of the first to third detection sections 13A to 13C, for example, as illustrated in FIG. 2, the same configuration can be adopted for all of these. In detail, the first to third detection sections 13A to 13C mainly include (pump device-side) wireless communication sections 15A to 15C, temperature sensors 16A to 16C, and vibration sensors 17A to 17C. Naturally, a specific configuration of each of the detection sections does not always have to be the same configuration as described above, and can be changed appropriately. A combination of the sensors provided to the detection sections can be adjusted appropriately like the following aspects, for example. In one aspect, of the second and third detection sections 13B to 13C that are provided in bearing portions of the electric motor 12 in the pump body 11, the second detection section 13B does not have the temperature sensor 16A, and the third detection section 13C does not have the vibration sensor 17C. In another aspect, the first detection section 13A does not have the vibration sensor and the temperature sensor, but has the pressure sensor and the flow rate sensor instead for measuring the pressure and the flow rate of water flowing through the pump body 11. When a specific description will be made on the detection section below, the first detection section 13A in the aspect illustrated in FIG. 2 will be described as a representative example.

The wireless communication section 15A may be a communication means for transmitting detection results detected by the temperature sensor 16A and the vibration sensor 17A, which will be described below, to the display device 20. As a communication method in this wireless communication section 15A, near-field wireless communication (NFC), infrared light communication, Bluetooth (including Beacon), Wi-Fi communication, or the like can be adopted. In regard to data that is transmitted by this wireless communication section 15A, the real-time detection results by the various sensors may constantly be transmitted to the display device 20. Alternatively, these detection results may be accumulated for a specified period, and then may be transmitted to the display device 20 either periodically or at specified timing. Thus, the first detection section 13A preferably has unillustrated internal memory that is constructed of a well-known storage medium or the like capable of storing the detection results by the various sensors for the specified period.

The temperature sensor 16A may be a sensor that detects the temperature of the pump device 10 by directly measuring a temperature of the outer wall of the pump body 11, on which the first detection section 13A is installed. As the temperature sensor that is adopted herein, a well-known thermistor, a well-known thermocouple, or the like can appropriately be selected for use.

The vibration sensor 17A outputs the vibration generated to the pump device 10 as a frequency, and a well-known vibration sensor capable of detecting acceleration, a speed, displacement, or the like can be adopted. In this embodiment, a vibration sensor capable of detecting three-dimensional vibration in longitudinal, lateral, and height directions is adopted. However, the vibration sensor is not limited thereto, and a vibration sensor capable of detecting only vibration in a one-dimensional or two-dimensional direction can be adopted. The vibration generated to the pump device 10 is often transmitted to the pump body 11 and the driveshaft of the electric motor 12, and a vibration direction thereof is often a direction that intersects the driveshaft. Accordingly, a vibration sensor capable of at least detecting vibration in a perpendicular direction to the driveshaft of the electric motor 12 is preferably adopted as each of the vibration sensors 17B, 17C of the second detection section 13B and the third detection section 13C that are provided in the bearing portions for supporting the driveshaft of the electric motor 12.

In the display system 1 according to this embodiment, a temperature change in the pump device 10 and the vibration generated to the pump device 10 can be detected with a high degree of accuracy by adopting the first to third detection sections 13A to 13C having the above-described configurations, and thus can be recognized visually on the display device 20 side.

Next, a description will be made on the display device 20 in the display system 1 according to this embodiment. As illustrated in FIG. 1 and FIG. 2, the display device 20 can be a device that includes a display section 21 capable of at least displaying information on the various state quantities of the pump device 10. For example, as this display device 20, a mobile communication terminal, such as a smartphone, a tablet terminal, or a mobile PC, as illustrated in FIG. 1 may be adopted, or a computer or the like for a management system that manages an area where the pump device 10 is installed may be adopted. As illustrated in FIG. 2, this display device 20 may at least include the display section 21, a processor 22, a (display device-side) wireless communication section (corresponding to an example of the data acquisition section) 23, memory 24, and an input/output interface (an example of the input interface) 25.

The display section 21 may constitute a so-called graphical user interface (GUI) that is constructed of a well-known display means, such as a liquid-crystal panel or an organic EL panel, capable of displaying the various state quantities of the pump device 10. In this display section 21, a chart (a diagram) and the like generated in a display control section 26, which will be described below, are displayed. By checking this display content, a user (for example, a worker who performs maintenance and the like of the pump device) can check presence or absence of abnormality of the pump device 10, and the like.

The processor 22 is an arithmetic means for various types of control in the display device 20, and can be constructed of a well-known CPU, a well-known GPU, or another arithmetic device. This processor 22 may include: the display control section 26 for specifying the display content to be displayed in the display section 21; and a threshold setting section 27 for setting a threshold that is used to determine the abnormality of the pump device 10. Of these, the display control section 26 generates a chart to be displayed in the display section 21 on the basis of the plural state quantities of the pump device 10 that are detected by the detection section 13 and received by the wireless communication section 23, which will be described below. A specific generation method of this chart will be described in detail below.

The wireless communication section 23 is an interface for receiving the various state quantities as the detection results of the detection section 13, and can be a communication means for which the same communication standard as each of the wireless communication sections 15A to 15C on the pump device 10 side is adopted. The wireless communication section 23 can sequentially receive data on the detection result that is transmitted from the one or plural detection sections 13 present in a communication range of this wireless communication section 23, and can store the data as the plural state quantities of the pump device 10 in the memory 24, which will be described below.

The memory 24 may be a storage means that is constructed of a volatile and/or non-volatile recording medium, such as ROM, RAM, or semiconductor memory. This memory 24 can store various programs for causing the processor 22 to perform specified operation, the detection result by the detection section 13 received via the wireless communication section 23, information on the threshold (will be described below) used at the time of generating the chart by the display control section 26, or the like.

The input/output interface 25 can be used to acquire the user's operations, such as a request to switch the display content and input of the threshold, and to make specified output, such as notification to the user, when necessary. As this input/output interface 25, for example, any of various pointing devices including a mouse, a touch pen, a touch panel, and a trackball, any of various operation buttons, an input interface such as a microphone, and any of output interfaces including a speaker, a vibrator, and the like can be adopted individually or in combination appropriately. Since the display device 20 according to this embodiment is the mobile communication terminal, the touch panel, the speaker, and the vibrator can be adopted as this input/output interface 25, for example.

A description will hereinafter be made on an example of display of the various state quantities, which are displayed in the display section 21 of the display device 20 including the above-described various components, by using several examples. First to third display examples, which will be described below, may be display aspects that are respectively set as first to third display modes. In this case, these display modes are preferably switchable by the user's operation or the like. In addition, in the first display example and the second display example, which will be described below, in order to simplify the description, such a case is assumed that the wireless communication section 23 only receives the detection result by the first detection section 13A.

Figure 3:
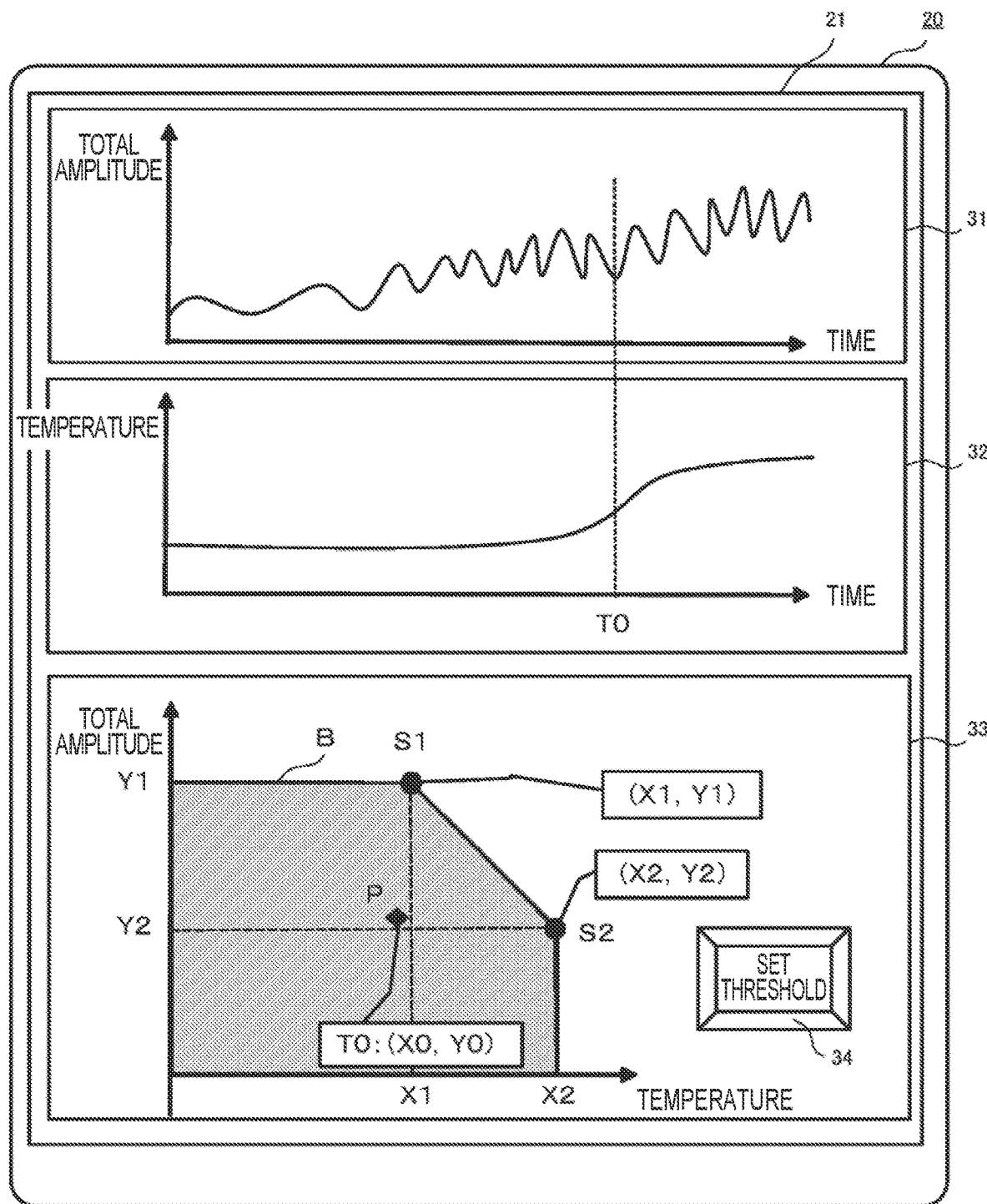
FIG. 3 is a schematic explanatory view illustrating a first display example that is displayed on the example of the display system according to the embodiment of the present disclosure.

FIG. 3 is a schematic explanatory view illustrating the first display example that is displayed on the example of the display system according to the embodiment of the present disclosure. In the first display example (also referred to as the "first display mode") illustrated in FIG. 3, a first time-series chart 31, a second time-series chart 32, and a first multidimensional chart 33 are displayed in the display section 21 that is located on a front surface of the display device 20. The first time-series chart 31 shows time-series data of an amplitude that is the detection result by the vibration sensor 17A. The second time-series chart 32 shows time-series data of the temperature as the detection result by the temperature sensor 16A. In the first multidimensional chart 33, a value of the amplitude of the vibration detected by the vibration sensor 17A is set on a vertical axis, and the temperature detected by the temperature sensor 16A is set on a horizontal axis.

The first time-series chart 31 is displayed in the display section 21 after the wireless communication section 23 on the display device 20 side receives three-dimensional output frequency data, which is detected by the vibration sensor 17A and transmitted from the wireless communication section 15A on the pump device 10 side, and then the display control section 26 specifies an absolute value of the amplitude from the received three-dimensional output frequency data and adjusts the absolute value to the time-series chart. Similarly, the second time-series chart 32 is displayed in the display section 21 after the wireless communication section 23 on the display device 20 side receives temperature data, which is detected by the temperature sensor 16A and transmitted from the wireless communication section 15A on the pump device 10 side, and then the display control section 26 adjusts the data to the time-series chart.

The first multidimensional chart 33 is a multidimensional chart in which the state quantities of the pump device 10 are set on the axes. In this embodiment, a two-dimensional chart is adopted in which an amplitude value and a temperature value as two of the state quantities are respectively associated with the vertical axis and the horizontal axis. The amplitude value and the temperature value, which define this first multidimensional chart 33, are defined by taking values, which are specified in a process of generating the first time-series chart 31 and the second time-series chart 32 described above, that is, the vertical axes of these charts into consideration. In addition, in this first multidimensional chart 33, a value of the pump device 10 at current time is plotted as a point P on the basis of a temperature value (X0) and the amplitude value (Y0) at the current time (for example, a T0 time point). In this embodiment, as the first multidimensional chart 33, the two-dimensional chart for which two of the temperature value and the amplitude value are adopted as parameters defining the axes of the first multidimensional chart 33 is adopted. However, a chart that is shown in three or more dimensions can also be adopted as long as the chart can be displayed in the display section 21. In this case, the state quantities of the pump device 10 other than the temperature value and the amplitude value can be adopted as the parameters. More specifically, for example, a three-dimensional chart, for which the current value of the electric motor 12, the amplitude value in the height direction (a z-direction in FIG. 1), and the amplitude value in the lateral direction (an x-direction in FIG. 1) are adopted as the parameters, can be adopted as the first multidimensional chart 33. Since visibility of the user at the time when the first multidimensional chart 33 is displayed in the display section 21 tends to be reduced in proportion to an increase in the number of dimensions, the two-dimensional or three-dimensional chart is preferably generated as the first multidimensional chart 33. It should particularly be noted that the multidimensional chart displayed in the display system 1 of the present disclosure always adopts the state quantities of the pump device 10 as the parameters corresponding to the axes. In the present disclosure, the various state quantities are adopted as the parameters that constitute the chart. Thus, the plural state quantities can be comprehended at a glance, and setting work for which the plural state quantities are taken into consideration can easily be performed when the thresholds are set.

In this first multidimensional chart 33, plural threshold points S1, S2 are shown such that it is possible to comprehend at a glance whether the point P indicating the values of the various state quantities of the pump device 10 at the current time has reached a value indicating the abnormality. These threshold points S1, S2 are set by the above-described threshold setting section 27. The threshold points S1, S2 illustrated in FIG. 3 define, as an example, a point (S1) including a combination of a permissible upper limit amplitude value and a permissible maximum temperature value at the time and a point (S2) including a combination of a permissible upper limit temperature value and a permissible maximum amplitude value at the time.

As in the above-described first display example, alignment of the three charts 31 to 33 on the display section 21 for the display is particularly advantageous for the user to detect the abnormality. That is, in addition to the first multidimensional chart 33, which shows the plural state quantities in one chart, the time series charts, each of which only shows the one state quantity can also be taken into consideration. Thus, the user who sees the first display example can diagnose the abnormality or predict failure by checking a relative change in the two related state quantities and distribution ranges thereof, or can improve accuracy of these determinations and the like.

FIG. 4 is a schematic explanatory table illustrating an example of a threshold setting screen according to the embodiment of the present disclosure. The plural threshold points S1, S2 can be set by the threshold setting section 27, for example, when a threshold setting icon 34, which is displayed in the display section 21 illustrated in FIG. 3, is pressed. As a threshold setting screen 35 that is displayed at the time, the threshold setting screen illustrated in FIG. 4 can be displayed, for example. As illustrated in FIG. 4, when the threshold points S1, S2 in this embodiment are set, the threshold setting icon 34 is pressed to display the threshold setting screen 35, and then, on this threshold setting screen 35, the user inputs an X coordinate (X1, X2, . . . Xn) and a Y coordinate (Y1, Y2, . . . Yn) of the point that the user wishes to specify as the threshold. In this way, the threshold can be set. In the first display example, only the two points of S1 (X1, Y1) and S2 (X2, Y2) are defined as the threshold points. However, the number of the points indicating the thresholds can appropriately be changed by setting or the like. It should particularly be noted that the thresholds are set by the threshold setting section 27 of the present disclosure in a state where the thresholds of the plural state quantities, in detail, the temperature value and the amplitude value are associated with each other. That is, as described above, in the case where the threshold points are set by inputting the X, Y coordinates, the two state quantities of the pump device 10 are specified in the state of being associated with each other due to a fact that both of the state quantities constitute the single threshold point. In this way, the threshold can be set in consideration of the plural state quantities. In the case where the threshold is set, just as described, it is possible to handle such a case where the determination of the abnormality is appropriate in consideration of the plural state quantities although the abnormality is not determined on the basis of the single state quantity alone.

The method for setting the threshold is not limited to the method by the input operation of the above-described coordinate as long as the plural state quantities are set in the mutually associated state. More specifically, the threshold may be defined, for example, when the threshold value setting icon 34 is pressed, and thereafter an operation to surround a specified area in the chart, which is displayed in the display section 21 of the display device 20, by the user's finger or the like via the input/output interface 25, for example, the touch panel. Even in the case where the threshold is set by such an operation, the threshold is set by the operation that is performed on the chart with the two state quantities as the parameters. Accordingly, the thus-set thresholds, which correspond to the plural state quantities, are set in the mutually associated state. When the threshold can be set through such an operation, there is no need to specify the value of the threshold in advance by calculation or the like at the time of setting the threshold. Thus, the threshold can be set by the further intuitive operation, and workability is improved.

In the first display example, only the two points (S1 and S2) are defined as the thresholds, and a straight line including these two points represents a boundary (hereinafter, this boundary will be referred to as a "threshold line B") between a normal value range and an abnormal value range. However, a shape of the threshold line B can be changed to a rectangular shape, a circular shape, or the like, for example, on the basis of the number of the threshold points, the specified input operation by the user, or the like. Furthermore, in FIG. 3, the normal value range and the abnormal value range are visually distinguished from each other by hatching an inner area surrounded by the threshold line B, that is, the normal value range. However, these ranges may be distinguished visually for display by using color display or another display pattern instead of this hatching.

In this embodiment, in the case where the point P is plotted at a position above the threshold line B, it is possible to notify the user of such a fact by using an unillustrated notification section of the display device 20. As this notification means, for example, the abnormality is displayed in the display section 21 by a color, blinking operation, or the like, or the speaker and the vibrator constituting a part of the input/output interface 25 can be operated.

As described above, according to the first display example according to the embodiment of the present disclosure, the various state quantities of the pump device 10, which are detected by the sensors, can be displayed in the form of the single chart. In this way, the user can comprehend a state of the pump device 10 by simply checking the chart, and the display with the high visibility that does not require to check each of the plural state quantities of the pump device 10 individually can be provided. In addition, the setting operation for which the plural state quantities are taken into consideration can be performed to set the threshold. Therefore, compared to the case where the independent threshold is set for each of the state quantities, it is possible to detect the abnormality generated to the pump device 10 with the high degree of accuracy.

Figure 5:
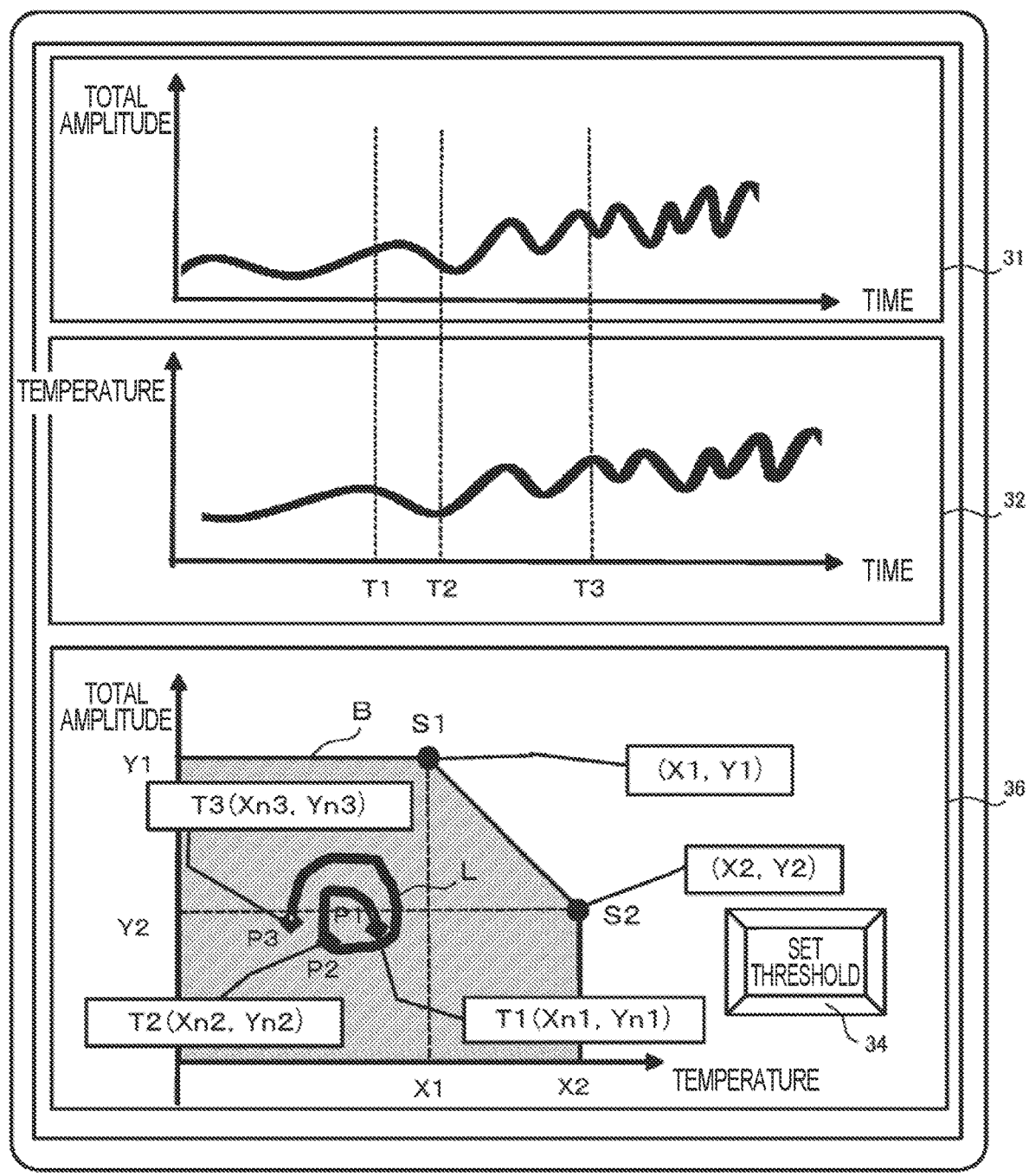
FIG. 5 is a schematic explanatory view illustrating a second display example that is displayed on the example of the display device according to the embodiment of the present disclosure.

Next, a description will be made on another example of the display according to this embodiment. FIG. 5 is a schematic explanatory view illustrating the second display example that is displayed on the example of the display device 20 according to the embodiment of the present disclosure. In the second display example (also referred to as the "second display mode"), the first time-series chart 31, the second time-series chart 32, and a second multidimensional chart 36 are displayed in the display section 21 that is located on the front surface of the display device 20. In the second multidimensional chart 36, the value of the amplitude of the vibration detected by the vibration sensor 17A is set on a vertical axis, and the temperature detected by the temperature sensor 16A is set on a horizontal axis. This second multidimensional chart 36 is the same as the first multidimensional chart 33 except that the points plotted in the chart are displayed differently. Thus, the following description will only be made on the different point from the first multidimensional chart 33, and the same points as the first multidimensional chart 33 will not be described.

In the second multidimensional chart 36, as illustrated in FIG. 5, in addition to values (P3) of the various state quantities of the pump device 10 at the current time, points (P1, P2, and the like) that are plotted in the specified period including the current time are shown (drawn) as a locus L such that a transition of the change in the various state quantities in the specified period can be understood. A period that is displayed as this locus L in the second multidimensional chart 36 (that is, a period from T1 to T3) may be set in advance, or the user can set an appropriate period therefor.

When the locus L is displayed in the chart as in the second multidimensional chart 36, the user can comprehend the various state quantities in the specified period including the current time at a glance. In this way, the user can comprehend the transition of each of the various state quantities of the pump device 10. Therefore, the visibility of the user can further be improved, and predictability of the abnormality by the user can be improved.

The description has been made on the first and second display examples in which the various state quantities of the pump device 10 at the current time are plotted. However, the plotted points are not limited to those at the current time. For example, in the case where the user wishes to check the state quantity at specific time that is displayed in the first time-series chart 31 or the second time-series chart 32, or the like, the state quantity at the specific time can be plotted in the first multidimensional chart 33 or the second multidimensional chart 36. In such a case, a drawing range of the locus L in the second display example can appropriately be adjusted as a specified period including the specific time point.

Figure 6:
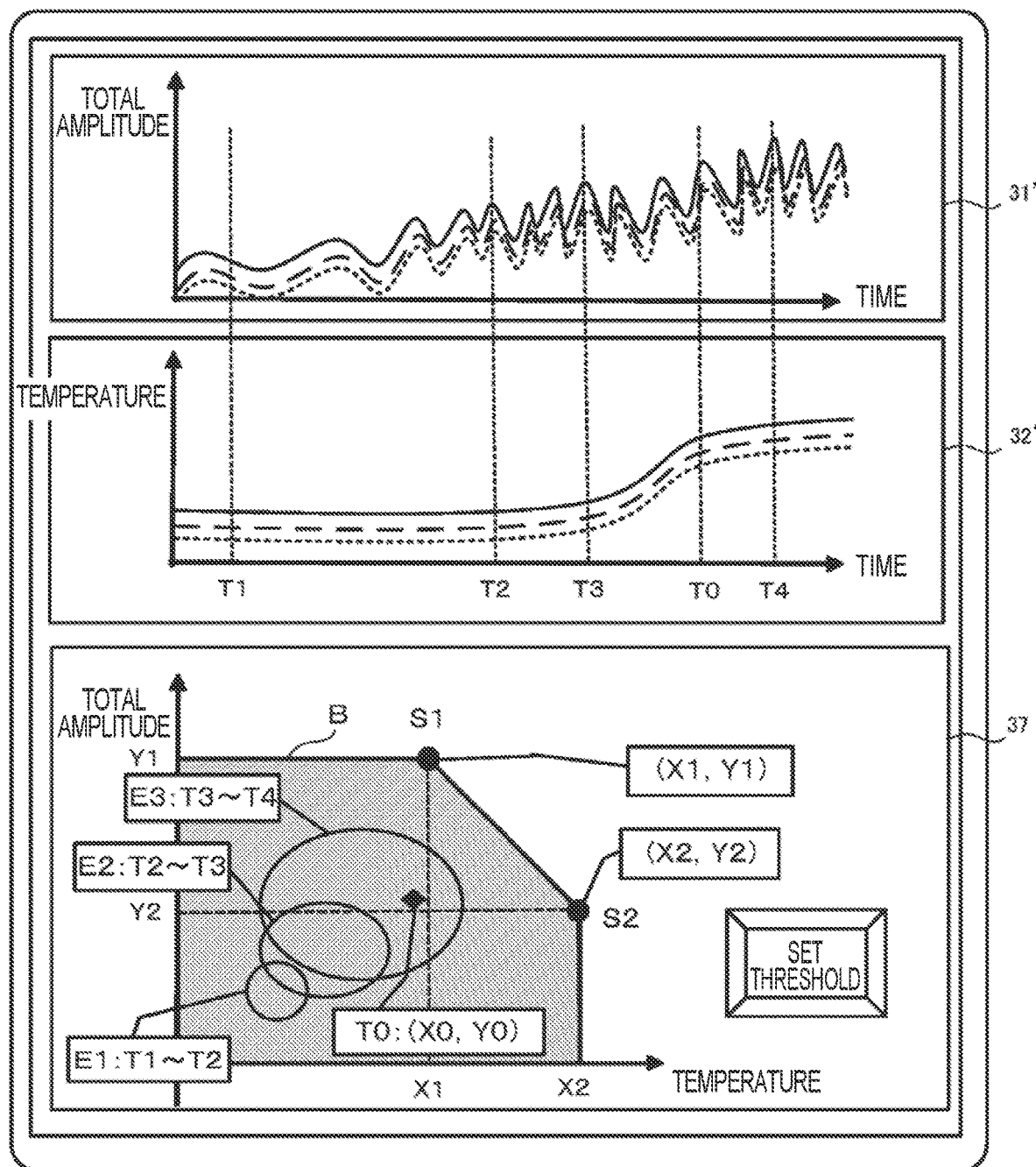
FIG. 6 is a schematic explanatory view illustrating a third display example that is displayed on the example of the display device according to the embodiment of the present disclosure.

Next, a description will be made on further another example of the display according to this embodiment. FIG. 6 is a schematic explanatory view illustrating the third display example that is displayed on the example of the display device 20 according to the embodiment of the present disclosure. In the third display example (also referred to as the "third display mode"), a first time-series chart 31', a second time-series chart 32', and a third multidimensional chart 37 are displayed in the display section 21. The first time-series chart 31' shows time-series data of the detection result by each of the vibration sensors 17A to 17C in the first to third detection sections 13A to 13C. The second time-series chart 32' shows time-series data of the detection result by each of the temperature sensors 16A to 16C in the first to third detection sections 13A to 13C. In the third multidimensional chart 37, the value of the amplitude of the vibration generated to the pump device 10 is set on a vertical axis, and the value of the temperature of the pump device 10 is set on a horizontal axis. This third multidimensional chart 37 is the same as the first multidimensional chart 33 except for a point that distribution regions (E1 to E3) of the plural state quantities of the pump device 10 in the specified period are shown and a point that the plotted point correspond to each of the state quantities detected by any one of the first to third detection sections 13A to 13C. Thus, the following description will only be made on the different points from the first multidimensional chart 33, and the same points as the first multidimensional chart 33 will not be described.

As illustrated in FIG. 6, each of the detection results by the first to third detection sections 13A to 13C is displayed in the first time-series chart 31' and the second time-series chart 32' according to the third display example. When the detection results by the plural detection sections are simultaneously displayed, just as described, it is possible to comprehend a difference in the detection result among the detection sections, that is, a difference in the detection result, which is caused by a difference in a detection position. For this reason, when a local fluctuation occurs to the temperature or the vibration of the pump device 10, for example, the user can easily comprehend such a fluctuation.

In the third multidimensional chart 37 according to the third display example, of the detection results by the plural detection sections displayed in the first time-series chart 31' and the second time-series chart 32', the state quantity that is based on the detection result by one of the detection sections is plotted by the user's selection operation, for example. FIG. 6 exemplifies a case where the detection result by the first detection section 13A (the results indicated by solid lines in the first time-series chart 31' and the second time-series chart 32') is displayed.

By the way, the various state quantities of the pump device 10 are usually changed according to a drive state of the pump device 10 such as an initial operation period, an initial speed increase period, an acceleration period, or a steady operation period. Accordingly, it is assumed that, in regard to the range of the detection result by the detection section, the distribution region thereof is shifted by lapse of time. Thus, in the third multidimensional chart 37, regions in each of which the detection result by the detection section is plotted within a specified time range are displayed as the first to third distribution regions E1 to E3 on the multidimensional chart. These distribution regions E1 to E3 can be specified by specifying the relevant time range. However, the time range may be specified by the user's input operation, or may automatically be specified by the display control section 26 by taking information on the drive state of the pump device 10 into consideration, for example.

The first distribution region E1 that is displayed in the third multidimensional chart 37 is a region where the detection results by the detection sections are plotted in a period from the time T1 to T2. Since the period from the time T1 to T2 is a period that corresponds to the initial operation period of the pump device 10, it is understood from a size of the first distribution region E1 that the vibration and the temperature are changed slightly. The second distribution region E2 is a region where the detection results by the detection sections are plotted in a period from the time T2 to T3. This period from the time T2 to T3 is a period that corresponds to the initial speed increase period of the pump device 10, and fluctuation widths of the amplitude value and the temperature are increased when compared to the first distribution region E1. The third distribution region E3 is a region where the detection results by the detection sections are plotted in a period from the time T3 to T4. This period from the time T3 to T4 is a period that corresponds to the acceleration period of the pump device 10, and is also a period in which the vibration and the temperature of the pump device 10 are increased most. Thus, a range of the third distribution region E3 is also the largest.

When the distribution region of the detection results within the specified time range is displayed as in the third display example, it is possible to easily recognize whether the state quantities are normally shifted according to the drive state of the pump device 10.

In each of the above-described display examples (display modes), the description has been made on setting of the value for specifying the boundary B between the normal value and the abnormal value as the threshold. However, this threshold can be set stepwise. For example, when a value which is the normal value but with which the abnormality is possibly detected in the near future is detected, in order to warn of such a value, a threshold for specifying a warning level may be set within the region of the normal value, in addition to the threshold for specifying the boundary B between the normal value and the abnormal value. By setting the threshold stepwise by level, just as described, the predictability of the abnormality that can occur to the pump device 10 is further improved.

In addition, in the case where the threshold is set stepwise according to the level thereof as described above, preferably, the notification means to the user by the notification section of the display device 20 is appropriately changed according to the level of the threshold. As a specific example, a yellow light can be turned on (or blinked) in the display section 21 when the threshold exceeds the threshold with which the warning is issued to the user, and an orange light can be turned on (or blinked) in the display section 21 when the threshold exceeds the threshold with which the user is notified of the abnormality. By notifying the user of the state of the pump device 10 stepwise, just as described, the user can easily comprehend the state of the pump device 10.

<Display Method>

Next, a description will be made on a method for displaying the various state quantities of the pump device 10. The display method, which will be described herein, can be executed by an appropriate computer, that is, a computer at least including a processor and memory that stores a program to operate the processor, and the like. In the following description, the above-described display device 20 is adopted as the computer that executes the display method. When the method is executed by the appropriate computer such as the display device 20, such a method can be provided in the form of a program that causes the processor of the computer to perform operation in the display method or in the form of a non-transitory computer readable medium in which the program is stored.

Figure 7:
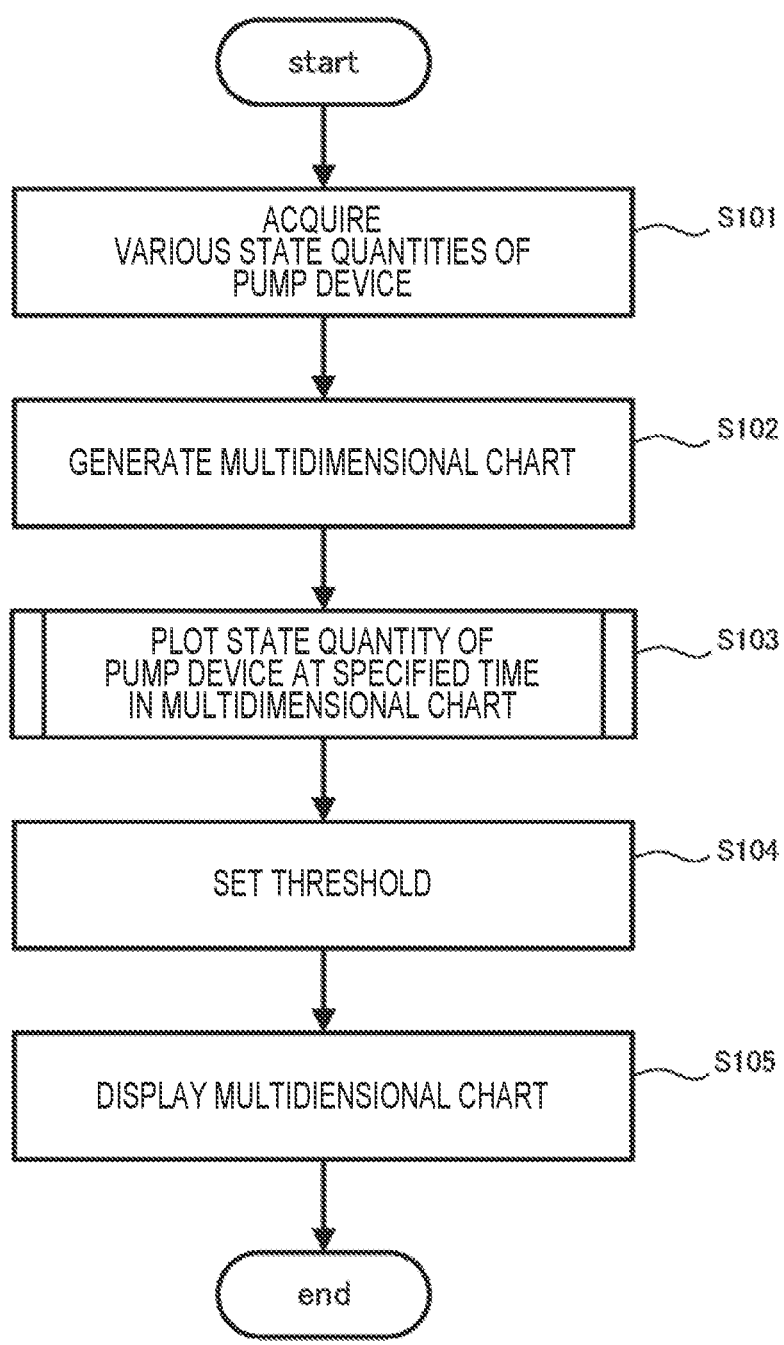
FIG. 7 is a flowchart illustrating an example of a display method according to the embodiment of the present disclosure.

FIG. 7 is a flowchart illustrating an example of the display method according to the embodiment of the present disclosure. In the display method according to this embodiment, as illustrated in FIG. 7, first, the plural state quantities of the pump device 10 are acquired by the first to third detection sections 13A to 13C that detect the plural state quantities indicating the state of the pump device 10 (step S101). The plural state quantities are acquired by data communication between the wireless communication section 23 of the display device 20 and the wireless communication sections 15A to 15C of the first to third detection sections 13A to 13C. When the wireless communication section 23 acquires the plural state quantities, the memory 24 stores these plural state quantities. Then, the display control section 26 generates the multidimensional chart for displaying the plural state quantities (step S102). The multidimensional chart generated herein is generated when the two or more state quantities are selected from the data on the plural state quantities stored in the memory 24 and are set as values corresponding to the respective axes of the chart. As the state quantities, each of which is set as the value corresponding to the respective axis of the chart, any of the state quantities detected by the first to third detection sections 13A to 13C may be selected as is, or a state quantity that is calculated by combining some of the state quantities detected by the first to third detection sections 13A to 13C may be selected. Once the multidimensional chart is generated, next, the plural state quantities of the pump device 10 at the specific time are plotted in the generated multidimensional chart (step S103).

Figure 8:
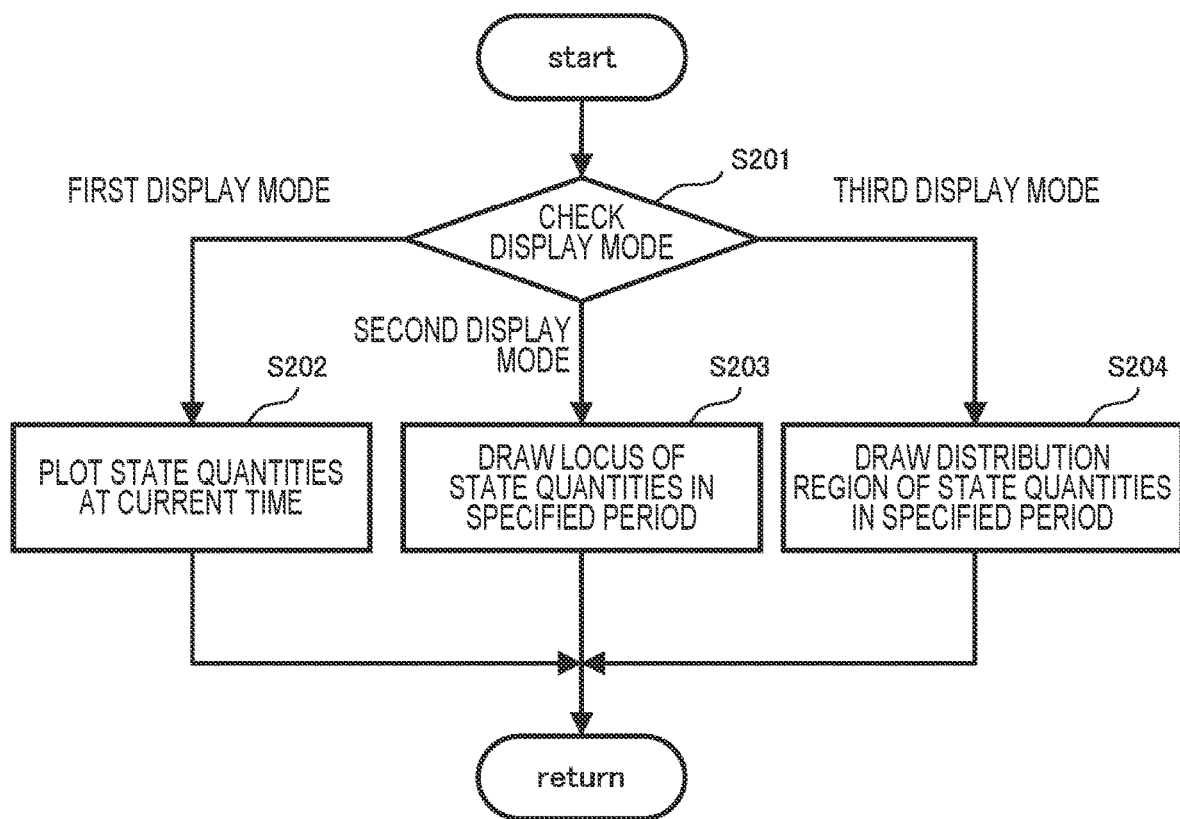
FIG. 8 is a flowchart illustrating an example of a subroutine of the display method according to the embodiment of the present disclosure.

FIG. 8 is a flowchart illustrating an example of a subroutine for a method for plotting the state quantity in the multidimensional chart in the example of the display method according to the embodiment of the present disclosure. In step S103, as illustrated in FIG. 8, the display mode that is set in advance or selected by the user is first checked (step S201). As a result of step S201, if it is identified that the first display mode is set or selected, the point P indicating the state quantities of the pump device 10 at the current time is plotted in the generated multidimensional chart (step S202). Meanwhile, as the result of step S201, if it is identified that the second display mode is set or selected, the point P3 indicating the state quantities of the pump device 10 at the current time is plotted in the generated multidimensional chart, and the locus L of the state quantities of the pump device 10 in the specified period including the current time is drawn therein (step S203). Furthermore, as the result of step S201, if it is identified that the third display mode is set or selected, the distribution regions E1 to E3 of the state quantities of the pump device 10 in the specified period are drawn in the multidimensional chart (step S204). Then, after any of above-described steps S202 to S204 is executed, the subroutine related to step S103 is completed, and the processing proceeds to step S104.

Once step S103 is completed, the threshold corresponding to each of the state quantities is set (step S104). Upon setting of the threshold, the threshold corresponding to each of the plural state quantities is set in the mutually associated state. This method for setting the threshold has already been described in the several specific examples. Thus, the description thereon will not be made here. In addition, in the display method according to this embodiment, the description has been made on the case where the threshold is set before the display of the multidimensional chart, which will be described below. However, timing of setting the threshold is not limited thereto. For example, the threshold may be set by the user's operation after the multidimensional chart is displayed or before step S103.

Finally, the generated multidimensional chart is displayed in the display section 21 with the point (P, P3) that is plotted on the basis of the specified display mode, the drawn locus (L) or the distribution regions (E1 to E3), and the set threshold points (S1, S2) and the threshold line (B) identified by the thresholds (S1, S2) (step S105).

As it has been described so far, according to the display method according to this embodiment, the multidimensional chart, in which the plural state quantities of the pump device 10 are adopted as the parameters, can be displayed with the threshold and the like. Therefore, the various state quantities of the pump device 10 can be displayed by the display method with the high visibility.

Other Embodiments

The display system, the display device, and the display method according to the embodiment of the present disclosure described above are not intended to be limited to the aspects described in the embodiment. Thus, various modifications can be made from the above-described aspects. The display system 1 according to the above embodiment has been exemplified in which, in the case where the threshold is set, the threshold setting section 27 sets the threshold only when the user presses the threshold value setting icon 34 and performs the input operation. However, the method for setting the threshold is not limited thereto. More specifically, for example, before the user sets the threshold, an initial set value of the threshold, which conforms to a model of the rotary machine device 10 as a target, can be set in advance. A description will hereinafter be made on a display system 1A that has a configuration capable of setting the above-described initial set value of the threshold as another embodiment of the present disclosure.

Figure 9:
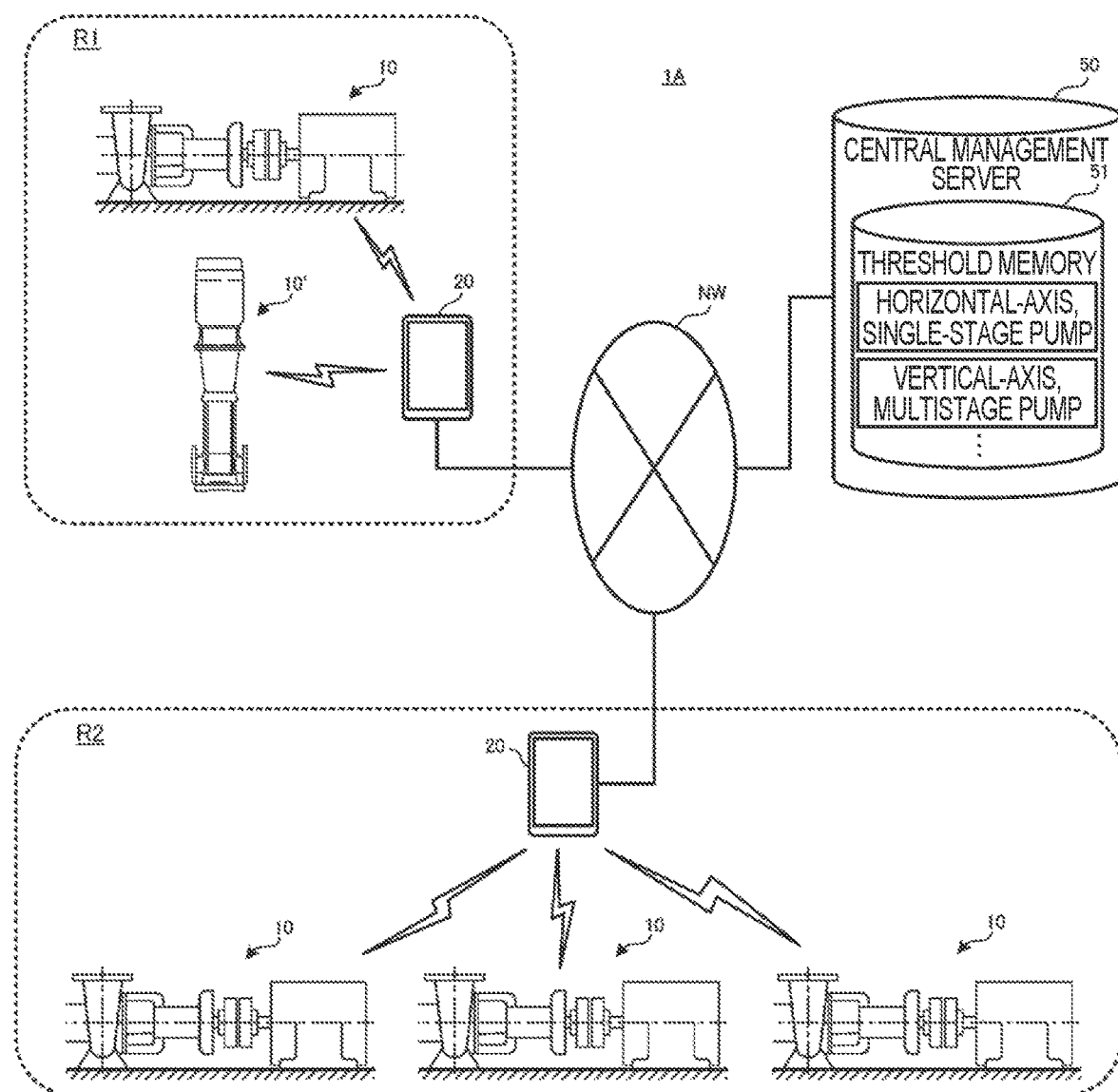
FIG. 9 is a schematic explanatory view illustrating an example of a display system according to another embodiment of the present disclosure.

FIG. 9 is a schematic explanatory view illustrating an example of the display system 1A according to the other embodiment of the present disclosure. The display system 1A according to the other embodiment illustrated in FIG. 9 has substantially the same configuration as the display system 1 according to the above-described embodiment except for a point that the display device 20 is connected to a central management server 50 via a network NW. Accordingly, the detailed description on various components of the display system 1A that are common to the display system 1 will not be made below, and a description will be made only on different components from those in the display system 1.

As illustrated in FIG. 9, the display system 1A according to the other embodiment includes the central management server 50 in addition to the pump devices 10, 10' and the display device 20. The plural pump devices 10, 10' and the plural display devices 20 may be provided in this display system 1A, and plural model types of the pump devices 10, 10' may be mixed.

The central management server 50 may be a data server configured to be communicable with the plural display devices 20 via the network NW. This central management server 50 also includes threshold memory 51 that is constructed of the well-known recording medium or the like therein. The threshold memory 51 stores plural initial set values of the thresholds for the plural state quantities of the pump device for each model of the pump device. These initial set values of the thresholds are then selected on the basis of a request from the display device 20, which is connected via the network NW, and are transmitted. The plural display devices 20, each of which can communicate with this central management server 50, may be a display device 20 disposed at a different site (R1, R2), and each of the display devices 20 can selectively display the states of the plural pump devices 10, 10'.

In the display system 1A having the above-described configuration, in the case where initial setting of the threshold is performed, first, model information of the pump devices 10, 10' as display targets is acquired in the display device 20. This model information can be acquired, for example, by the user's input operation, by recognizing two-dimensional barcodes or IC tags that are adhered to the pump devices 10, 10' in advance, or by extracting model names that are stored in the memory 24 of the display device 20 at the time of shipment of the pump devices 10, 10' from a factory.

When acquiring the model information of the pump devices 10, 10' as the display targets, the display device 20 transmits a data acquisition request including this model information to the central management server 50. The central management server 50 that has received the data acquisition request takes the model information in the data acquisition request into consideration, and extracts the initial set value of the threshold for the relevant model from the threshold memory 51. Then, the central management server 50 replies to the display device 20 with the initial set value of the threshold. The display device 20 that has received the initial set value of the threshold from the central management server 50 stores this initial set value in the memory 24 and plots this initial set value of the threshold on the multidimensional chart, which is created on the basis of the plural state quantities acquired by the detection section 13 and is displayed in the display section 21.

Through a series of processes described above, the display system 1A according to this embodiment can acquire in advance the initial set value of the threshold value that corresponds to the model of the pump device as the display target. In this way, the user can acknowledge the threshold, which is usually set in the pump device as an inspection target, by simply checking the display section 21. Thus, setting of the threshold is unnecessary, or the setting work therefor is significantly simplified. Therefore, efficiency of the inspection work is improved. Meanwhile, particularly, in the case where the plural model types of the pump devices 10, 10' as the inspection targets are mixed like those at the site R1 illustrated in FIG. 9 (here, the pump device 10 at the site R1 is a horizontal-axis, single-stage pump and the pump device 10' is a vertical-axis, multistage pump), the user can comprehend the initial set value without checking the optimum threshold for each of the models, and thus the efficiency of the inspection work is particularly improved.

The description has been made on the case where the threshold memory 51 is disposed in the central management server 50 in the display system 1A according to the other embodiment described above. However, for example, a similar effect can be obtained by storing similar data as that in the threshold memory 51 in the memory 24 (or an unillustrated storage area in the display control section 26) of each of the display devices 20 and causing this memory 24 to function as the threshold memory 51. In addition, in this case, the initial setting of the threshold can be performed without the communication of the display device 20 via the network NW. Thus, there is no restriction on communication environment.

The present disclosure is not limited to the above-described embodiments, and various modifications can be made thereto within the scope that does not depart from the gist of the present invention. All of those modifications are included in the technical idea of the present invention.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A display system, comprising:
   a rotary machine device that includes a rotary machine and a drive machine that causes the rotary machine to rotate;

a display device configured to display a state of the rotary machine device;

detection sensors that acquire a plurality of state quantities indicating the state of the rotary machine device;

a processor configured to set a threshold, corresponding to the respective plurality of state quantities, for detecting abnormality of the rotary machine device, in a mutually associated state; and a display that displays a chart on the display device, on the basis of the plurality of state quantities acquired by the detection sensors, the chart being configured as a multidimensional chart in which the plurality of state quantities of the rotary machine device at specific times are plotted and the threshold at the specific time are displayed wherein every axis of the multidimensional chart is set to a respective one of the plurality of state quantities acquired by the detection sensors.

2. The display system according to claim 1, wherein the plurality of state quantities includes at least two of a temperature of the rotary machine device, vibration generated at the rotary machine device, a pressure of a fluid transported by the rotary machine device, a flow rate of the fluid, a rotational speed of the drive machine, or a current value of the drive machine.

3. The display system according to claim 1, wherein, in the multidimensional chart, the plurality of state quantities of the rotary machine device at a current time, a locus of the plurality of state quantities of the rotary machine device in a specified period including the current time, or a distribution region of the plurality of state quantities of the rotary machine device in the specified period, are displayed.

4. The display system according to claim 1, wherein, in addition to the multidimensional chart, the display device simultaneously displays:

a first time-series chart that shows time-series data of a first state quantity of the plurality of state quantities, and a second time-series chart that shows time-series data of a second state quantity of the plurality of state quantities.

5. The display system according to claim 1, wherein the processor sets the specified threshold by designating a specified range in the multidimensional chart displayed on the display device using an input interface.

6. The display system according to claim 1, wherein:

the threshold, corresponding to the respective plurality of state quantities, for detecting the abnormality of the rotary machine device is set stepwise by level, and the display system further comprises a notification section that provides notification according to the level of the threshold that the plurality of state quantities of the rotary machine device have exceeded.

7. The display system according to claim 1 further comprising:

a threshold memory in which the threshold, corresponding to the respective plurality of state quantities, for detecting the abnormality of the rotary machine device is associated with respective models of the rotary machine device and is saved as a first threshold group, wherein, when initially setting the threshold, the display sets the threshold associated with the models of the rotary machine device from the first threshold group saved in the threshold memory.

8. The display system according to claim 1, wherein:

the plurality of state quantities acquired by the detection sensors comprises a first state quantity acquired by the detection sensors, and a second state quantity acquired by the detection sensors, and the multidimensional chart has a vertical axis corresponding to the first state quantity acquired by the detection sensors, and a horizontal axis corresponding to the second state quantity acquired by the detection sensors.

9. The display system according to claim 8, wherein the first state quantity and second state quantity acquired by the detection sensors each comprise a temperature of the rotary machine device, a vibration generated at the rotary machine device, a pressure of a fluid transported by the rotary machine device, a flow rate of the fluid, a rotational speed of the drive machine, or a current value of the drive machine.

10. A display device, comprising:

a display section;

a data acquisition section that acquires a state quantity indicating a state of a rotary machine device, the rotary machine device including a rotary machine and a drive machine that causes the rotary machine to rotate;

a processor configured to set a threshold, corresponding to the respective plurality of state quantities, for detecting abnormality of the rotary machine device, in a mutually associated state; and a display that displays a chart in the display section on the basis of a plurality of the state quantities acquired by the data acquisition section, the chart being configured as a multidimensional chart in which the plurality of state quantities of the rotary machine device at specific times are plotted and the threshold at the specific time are displayed, wherein every axis of the multidimensional chart is set to a respective one of the plurality of state quantities acquired by the data acquisition section.

11. The display device according to claim 10, wherein:

the plurality of state quantities acquired by the data acquisition section comprises a first state quantity acquired by the data acquisition section, and a second state quantity acquired by the data acquisition section, and the multidimensional chart has a vertical axis corresponding to the first state quantity acquired by the data acquisition section, and a horizontal axis corresponding to the second state quantity acquired by the data acquisition section.

12. The display device according to claim 11, wherein the first state quantity and second state quantity acquired by the data acquisition section each comprise a temperature of the rotary machine device, a vibration generated at the rotary machine device, a pressure of a fluid transported by the rotary machine device, a flow rate of the fluid, a rotational speed of the drive machine, or a current value of the drive machine.

13. A display method, comprising:

acquiring a plurality of state quantities indicating a state of a rotary machine device, the rotary machine device including a rotary machine and a drive machine that causes the rotary machine to rotate;

generating a multidimensional chart in which each of the plurality of state quantities is set as a value corresponding to respective axes;

plotting the plurality of state quantities of the rotary machine device at specific times in the multidimensional chart;

setting a threshold, corresponding to the respective plurality of state quantities, for detecting abnormality of the rotary machine device, in a mutually associated state; and displaying the multidimensional chart, in which the plurality of state quantities of the rotary machine device at the specific times are plotted and the threshold at the specific time are displayed, on a display device, wherein every axis of the multidimensional chart is set to a respective one of the plurality of state quantities.

14. The display method according to claim 13, wherein plotting the plurality of state quantities of the rotary machine device at the specific times in the multidimensional chart at least includes one of:

plotting the plurality of state quantities of the rotary machine device at a current time in the multidimensional chart;

plotting a locus of the plurality of state quantities of the rotary machine device in a specified period including the current time in the multidimensional chart; and plotting a distribution region of the plurality of state quantities of the rotary machine device in the specified period in the multidimensional chart.

15. The display method according to claim 13, wherein:

the plurality of state quantities comprises a first state quantity and a second state quantity, and the multidimensional chart has a vertical axis corresponding to the first state quantity, and a horizontal axis corresponding to the second state quantity.

16. The display method according to claim 15, wherein the first state quantity and second state quantity each comprise a temperature of the rotary machine device, a vibration generated at the rotary machine device, a pressure of a fluid transported by the rotary machine device, a flow rate of the fluid, a rotational speed of the drive machine, or a current value of the drive machine.

\* \* \* \* \*